May 16, 1950        G. R. BOND, JR        2,507,496

MOLDED CONTACT MASSES

Filed Dec. 31, 1947

INVENTOR.
GEORGE R. BOND, JR.
BY Gordon A. Kessler
ATTORNEY.

Patented May 16, 1950

2,507,496

UNITED STATES PATENT OFFICE 2,507,496

MOLDED CONTACT MASSES

George R. Bond, Jr., Paulsboro, N. J., assignor to Houdry Process Corporation, Wilmington, Del., a corporation of Delaware Application December 31, 1947, Serial No. 794,910

12 Claims. (Cl. 252—455)

The present invention relates to contact masses active in promoting or assisting chemical conversion. More particularly it deals with solid contact masses of unitary structure comprising different components, one that is active and capable of promoting desired conversions, and another possessing different properties than said active component. In particular, it is concerned with unitary contact masses of the character described in which the catalytically active component is an adsorptive material derived by drying or baking a moldable or otherwise workable wet material that shrinks during the drying or baking process.

Catalytically active materials comprising or derived from clays and other minerals, or synthetically prepared gels, precipitates and the like have been used extensively in conversions which produce carbonaceous, hydrocarbonaceous or other burnable deposit thereon with resultant and usually temporary impairment of adsorptive, catalytic or other desirable properties of the active material. Consequently, periodic and usually frequent regenerations of the contact material, as by burning, have been necessary to restore its activity and extend its useful life. In processes of this character, to which contact masses with which the present invention is concerned are particularly valuable, it is advantageous if not necessary to practical operation that the adsorptive active material be present in substantial if not predominating proportion of total contact mass. Also, in such processes, especially in the interest of temperature and other control of the contact operation it has been proven highly advantageous to have present in the reaction zone as contact mass, in addition to adsorptive active material, solid material which provides additional heat capacity. The last named solid material is one of relatively high heat capacity and according to prior practice, is one relatively inert with respect to the reactions taking place within the reaction zone.

In accordance with the invention, novel contact masses in the form of unitary elements comprising on the one hand adsorptive, active components and, on the other hand components of relatively high heat capacity are prepared in a novel manner. The novel contact mass is composed of substantial proportions, usually at least 20% by volume of each of the aforesaid types of material and comprises a core or nucleus of the desired high heat capacity material. Disposed around this core to completely or substantially completely enclose the same is a shell of substantial thickness of hard adsorptive, active material. Within the unitary elements, the active and inert components occur in independent or substantially non-bonding, but preferably closely spaced and even substantially completely engaging, relation.

To prepare the contact masses of the invention a paste or other workable wet mass comprising the active component of the final product is placed or formed as a continuous shell loosely but completely or substantially completely enclosing the hard core. As disposed around the core the interior dimensions of the shell are somewhat greater than the exterior dimensions of the core so as to provide for clearance entirely around the latter. Thereafter the unitary element is subjected to drying under conditions which harden the wet workable mass while it undergoes shrinkage to develop a hard continuous shell of the final active component. The preferred drying conditions include temperature sufficiently high, usually at calcination level, to effect permanent shrinkage and setting of the shell to a continuous, porous body having substantial structural strength. When the active material comprises or contains predominating proportions by volume of, a hydrosilicate of alumina, or a synthetically prepared oxide or plurality of oxides, such as gels or precipitates, for example, of silica, alumina, or desired combinations of any or all of the oxides, silica, alumina, zirconia, beryllia, titania, the drying and heat treating conditions include preferably temperatures of 700° F. or higher. In any event the temperatures reached should be sufficiently high to effect setting of the workable material to a permanently hard shell of the physical character described.

The nature of the core material, or the exterior surface it presents to reactants and reaction products penetrating the enclosing shell, depends to some extent upon the function that the core is to perform and the nature of the reactants and reaction taking place in the presence of the unitary contact mass. If the core is to serve as a heat retention material having no effect upon the reactions other than that resulting from its heat retention properties, it preferably is composed of or presents surface of material catalytically and chemically inert to the reactants and reaction products. Typical instances to which inert heat retention materials are of particular value include catalytic cracking, depolymerization, dealkylation, dehydrogenation of hydrocarbons and their derivatives. With reactions of this character suitable inert core materials include dense substances, for example, fused quartz, fused alumina and materials of high alumina content (and preferably low in iron content), such as "Alundum, Corhart" and the like. Also, fused hydrosilicates of alumina, especially those of low iron content, are advantageous. If very high heat capacity per unit volume of the core is desired the core may be metallic but coated, however, with a suitable inert material, for example, a heavy metal, such as iron or steel to which fused alumina has been applied, as by calorizing. If the core is to exert limited catalytic influence on the reactions it may be of a catalytic metal or metal oxide which acquires little or no carbonaceous deposit.

In forming or disposing the workable, wet mass around the inert material the quantity of such mass used is sufficient considering the external dimensions of the unitary element to provide a hardened active material of adequate thickness around the volume occupied by the core to be self-supporting, and preferably capable of resisting crushing and other loads encountered in normal use, for example, within a column or bed of the same. For composite units having major external dimension of about a half inch and of spherical or spheroidal shape, the thickness of the layer of active material surrounding each unit or particle of inert material, of similar shape and of about one-quarter inch or more in major dimension, should be of the order of at least two millimeters. When the particles of inert material are smaller, as down to twenty mesh or smaller (U. S. Standard Sieve Series) the enveloping or enclosing layer of active material may be one millimeter thick or somewhat less.

In preparing the novel unitary contact masses of the invention, especially according to the aspects thereof where the final mass is composed of a shaped or molded shell of active material enclosing a single particle or piece of inert solid, the workable mass containing the active ingredient may be formed into a plurality of segments of the proper shape capable of being flowed together or otherwise joined to form the shell of suitable internal dimension. Then the segments may be fitted and joined together around the inert core and in spaced relation to the latter. The thus assembled structures are then ready for the heat treatment to effect shrinkage of and to develop the catalytic and physical properties of the shell.

According to preferred aspects of the invention, however, the particles comprising the inert material are coated with a suitable spacing material which maintains the core and active materials in spaced relation during application of the latter. The spacing material is one which, during subsequent shrinkage of the outer layer permits that layer to shrink toward the core and occupy volume filled by the spacing material. Particularly suited to practice of this aspect of the invention are spacing materials which at room temperature or somewhat higher temperatures have sufficient body, to be resistant to penetration by the workable wet mass as it is applied thereto, and which at drying temperature melt or become sufficiently reduced in consistency to permit such penetration. Suitable spacing materials include paraffin and other waxes, sulphur, naphthalene, asphalt, heavy greases, petroleum jellies and the like.

If desired, the outer layer of workable mass may be so applied to the coated inner core as to provide openings therethrough to facilitate egress of the melted or thinned spacing material. It is to be understood, however, that it is not always necessary for such openings to be provided. With many if not most plastic clay or workable wet masses of gels or gelatinous precipitates, the porous solid developed by the drying procedure is sufficiently open to accommodate the melted or thinned spacing material. If the latter is burnable, as is preferred, any spacing material that remains within the dried unit may be removed during subsequent calcination in air.

In the accompanying drawings, which indicate in simplified form certain elements of equipment for one method of preparing the novel unitary contact masses of the invention:

Figure 1:
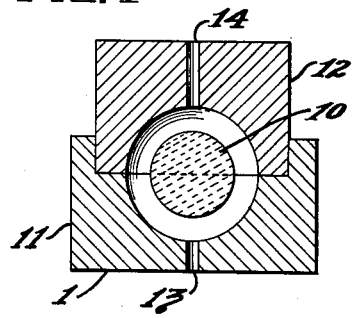
Fig. 1 is a sectional elevation of matching dies in position for applying spacing material or workable wet mass to the core.
Figure 2:
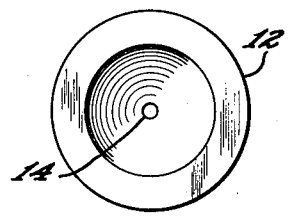
Figs. 2 and 3 are plan views of the dies of Fig. 1.
Figure 3:
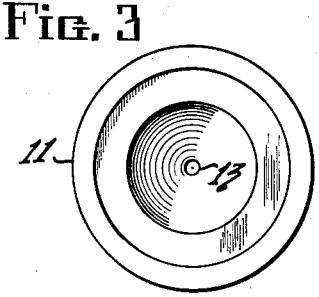

In Fig. 1, a suitably shaped core 10 of desired core material such as a refractory oxide or a material presenting a refractory oxide surface, is shown within the cavity provided by matching dies 11 and 12, which cavity and core are of desired shape such as spherical, spheroidal or cylindrical. Dies 11 and 12 are provided with feeding channels 13 and 14, respectively, into which a suitable spacing material, for example, molten wax, is forced from a suitable supply (not shown) into the space between the exterior of core 10 and the surrounding interior wall of the cavity.

Figure 4:
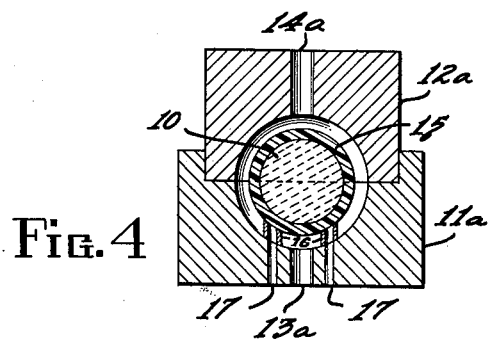
Fig. 4 is a sectional elevation of a modified set of dies.
Figure 5:
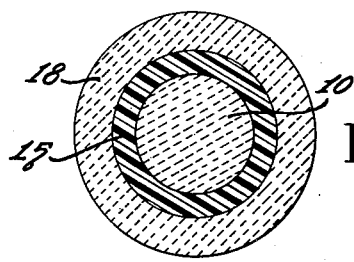
Fig. 5 is a plan of one of the dies of Fig. 4.

After cooling and solidification of the molten wax, the core of inert material covered with wax coating or layer 15 of the desired thickness is transferred to a similar set of matched dies 11a and 12a (Fig. 4) providing a cavity sufficiently large to accommodate the coated core while leaving adequate peripheral volume for the layer of active material to be applied thereto. In order to insure uniform thickness of that layer the coated core 10 may be positioned within the cavity by use of suitable supporting members such as posts or rests 16 provided in die 11a. As shown, posts 16 may be hollow and communicating with passages 17 in die 11a.

Figure 6:
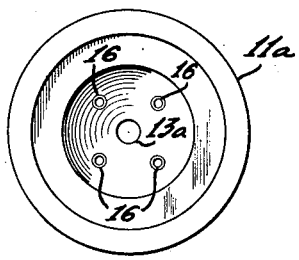
Fig. 6 is a section of a typical unitary contact mass, before hardening of the outer active layer.

Then, the wet, moldable mixture, for example a wet gel, a thixotropic paste of dried gel in water, or a paste of clay and water, may be forced from a suitable source (not shown) into the peripheral space around the coated core by either or both channels 13a and 14a until that space is filled with the same. The resulting intermediate product thereupon has the structure indicated in Fig. 6, consisting of the core 10, wax layer 15, and an outer layer of wet workable material 18.

This intermediate product is then subjected to drying at elevated temperatures. For this step, the intermediate product may be left in the matching dies 13a and 14a, or, if the wet outer layer of material 18 is sufficiently tough to warrant reasonable handling, this product may be removed from the dies before heating.

In either event, during the early stages of the application of heat, and usually when the temperature of the intermediate unit is at low drying temperature as within the range of 140° F. to 220° F., setting and shrinkage of the material 18 begins. Simultaneously, the material in layer 15 softens or melts to be forced into the shrinking outer layer, or, if that layer is apertured, as for example, by use of members 16, the spacing material leaves the unit by such apertures. In the event drying is effected by heating in a die such egress of the spacing material is by channels such as indicated at 17 in die 11a.

In preferred practice of the invention the temperature of the unit is raised, toward the latter portions of the drying period to calcination level at which a substantial part of any combined water within the workable mass is removed, as from about 700° F. to any level consistent with development of desired activity and structural strength. With active clays such as acid activated montmorillonites to be used in calcined state as catalysts for hydrocarbon conversions involving cracking or polymerization, the calcination temperature may be and preferably is of the order of 1000° F. or higher, as up to 1200° F. Many synthetic oxides obtained from gels or precipitates tolerate higher temperatures than clays without impairment of activity, as up to 1400° F. or even higher.

Figure 7:
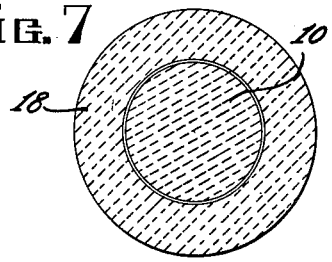
Fig. 7 is a section of a typical finished unit.

When drying and calcination have been completed, the outer layer 18 has shrunk toward core 10 while developing into a coherent, strong shell. Thus, if the layer 15 of spacing material is of proper thickness the catalytically active layer as completely shrunk is in close spaced relation to core 10 as indicated in Figure 7.

It is to be understood, of course, that if dies are used in preparation of the unitary composite contact masses, a large number of dies may be used simultaneously, mounted, for example, on properly spaced and synchronized endless belts which effect engagement and disengagement of the matching dies at proper intervals, the engaged dies between such intervals passing successively through operating stations or zones at which the proper process step in preparing the finished unit is effected.

The above method of preparing the catalytically active contact masses is presented by way of example of one method that is applicable. Another method is indicated in the following specific example.

Essentially spherical pellets of about 10 mm. diameter composed of Al₂O₃ which had been fired at sufficiently high temperature to produce inactive Al₂O₃ were dipped in molten paraffin several times until a coating of the cooled wax of about 1 mm. in thickness was obtained. The thus wax coated pellets were rolled in a mildly thixotropic paste of synthetically prepared dried silica-alumina gel of the type used for making highly active cracking catalyst, and water. Rolling was continued until a layer of about 4 mm. thickness had built up on the wax. A small hole was punched through this layer. Then the composite unit was dried at about 200° F. to 250° F. during which step the wax melted and escaped from the aforesaid punched hole. After drying was completed the central core had substantial and easily detected freedom of movement. Thereafter the dried units were calcined in air at temperature of about 1400° F. to produce the finished composite units. In the finished units the outer shells closely engaged and completely enclosed the alumina cores. No perceptible freedom of movement of the latter could be detected upon shaking. There were approximately equal volumes of active and inert material in the composite units, which exhibited strength sufficient for normal commercial use even in a deep bed.

The method described above for preparation of unitary, composite contact masses represents only one embodiment of the process of the invention.

In its broader aspects the invention contemplates and includes within its scope other methods of applying spacing and wet, workable substances to the relatively inactive core material. If the spacing material is viscous fluid or semi-fluid substance capable of adhering to the core, for example viscous tar, oil or grease, it may be applied by immersing or rolling the core material therein.

Application of the wet workable material to the thus precoated core may be then effected in any desired manner that yields the finished continuous and active shell of substantial thickness required. Thus, when the wet, workable material is crumbly in texture but adherent, a layer of desired thickness is obtainable by extended rolling of the coated core therein, especially when the coating material is firm, as is the case with waxes in their hardened form.

When the wet workable material is thixotropic in nature, one method of applying it is by repeated dipping of the coated core in a thixotropic paste of suitable consistency while the paste is in its more mobile form. Sufficient time is then allowed between dippings to allow the deposited material to convert to its less mobile form. Materials to which this procedure applies includes thixotropic clay mixes and to hydrogels.

Another method of preparing the unitary contact masses with which the invention is concerned, that is particularly valuable in instances where it is desired that the finished units each contain several pieces of the relatively inert solid, is to mix suitably sized particles of the solid, after coating them with the spacing material, with a moldable wet mass of the active component. The resulting mixture is then molded, as by casting or extrusion. In practice of this aspect of the invention the particles of inert solid are preferably quite small, as not in excess of about one-eighth inch in major dimension. Suitable sizes include from about one-thirty-second inch to about one-eighth inch. The coating of spacing material is then quite thin, as may be obtained, for example, by dipping the inert particles in molten wax and allowing excess molten wax to drain therefrom while maintaining the particles at temperature sufficiently high to keep the wax in molten state.

Contact masses of the type with which this invention is concerned possess valuable and even unique properties. The outer shell and core being in independent or non-bonding association permits utilization of catalytic material in substantial proportion of the total unit with all or substantially all exposed or outer surfaces of the unit being catalytically active. This independent association, maintained during preparation and use of the contact units, in fact makes possible the use of outer shells having and maintaining with use over widely variant temperature ranges the strength and other physical properties desired for practical use. In the novel unitary contact masses the layer of catalytic material is free of spalling, cracking or breakage resulting from any difference of coefficients of expansion between the catalytic and core materials. In addition, the independent association maintained during preparation provides for development of a strong outer shell free of such defects. Furthermore, in the finished units the catalytic and higher heat capacity components are in intimate association so that full temperature stabilizing effect of the higher heat capacity material is realized in each.

I claim as my invention:

1. A catalytically active contact mass in the form of molded units each consisting essentially of adsorptive catalytically active solid material and refractory catalytically inert solid material, said units comprising in close but spaced relation a core of said inert solid and a hard shell of said catalytically active material substantially completely enclosing said core, said shell being a continuous structural member of substantial thickness having sufficient strength to withstand independently crushing and other forces encountered during use of the contact mass.

2. A catalytically active contact mass in the form of molded units containing catalytically active and inert components, each of said units consisting of a center core of said inert component and an outer shell of substantial thickness completely enclosing but spaced from said core, said outer shell being a continuous structural body of calcined hydrosilicate of alumina comprising at least 20% by volume of the unit and having thickness sufficient to withstand independently crushing and other forces encountered during use of the contact mass.

3. A catalytically active contact mass in the form of molded units containing catalytically active and inert components each of said units consisting of a center core of said inert material and an outer shell of substantial thickness substantially completely enclosing but spaced from said core, said outer shell being a continuous hard structural body of calcined gelatinous oxide of sufficient strength to withstand independently the crushing and other forces encountered during use of the contact mass.

4. In the preparation of unitary contact masses containing hard adsorptive catalytically active solid and solid of higher heat capacity than said catalytically active solid, the process of disposing around a core of said higher heat capacity solid to substantially completely enclose the same a shell of wet workable mixture which upon drying and shrinkage yields said catalytically active solid, said shell having greater internal dimension than the external dimension of said core, and drying and shrinking said shell to develop said catalytically active solid in hard continuous form, thereby yielding a unitary contact mass in which the hard component parts are independently associated.

5. In the preparation of contact masses containing hard adsorptive, catalytically active solid and solid of higher heat capacity than said catalytically active solid from said solid of higher heat capacity and a wet workable mass which upon drying and shrinkage produces said catalytic solid, the process of applying to pieces of said higher heat capacity solid a layer of material which at low temperature possessess sufficient body to resist penetration by said wet workable mass and at higher temperature suitable for drying of the latter becomes sufficiently reduced in consistency to permit such penetration, applying said wet workable mass to said material at such low temperature to provide a shell substantially completely enclosing said coated pieces, and thereafter subjecting the resulting unit to elevated temperature to effect drying of said wet workable mass and shrinkage of the shell of the same toward said pieces and into the space occupied by said material.

6. In the preparation of contact masses containing hard adsorptive, catalytically active solid and solid of higher heat capacity than said catalytically active solid from said solid of higher heat capacity and a wet workable mass which upon drying and shrinkage produces said catalytic solid, the process of applying to pieces of said higher heat capacity solid a layer of material which is solid at low temperature and molten at higher temperature suitable for drying of said wet workable mass, applying the latter to said material at such low temperature to provide a shell substantially completely enclosing said coated pieces, and thereafter subjecting the resulting unit to elevated temperature to effect drying of said wet workable mass and shrinkage of the shell of the same toward said pieces and into the space occupied by said material.

7. In the preparation of contact masses containing hard adsorptive, catalytically active solid and solid of higher heat capacity than said catalytically active solid from said solid of higher heat capacity and a wet workable mass which upon drying and shrinkage produces said catalytic solid, the process of applying to pieces of said higher heat capacity solid a layer of material which at low temperature possesses sufficient body to resist penetration by said wet workable mass and at higher temperature suitable for drying of the latter becomes sufficiently reduced in consistency to permit such penetration, applying said wet workable mass to said material at such low temperature to provide a shell substantially completely enclosing said coated pieces, but providing an aperture therethrough, and thereafter subjecting the resulting unit to elevated temperature to effect drying of said wet workable mass and shrinkage of the shell of the same toward said pieces and displacement of said material through said aperture.

8. In preparing catalytically active contact masses comprising adsorptive catalytic material and inert material in intimate relation, the process of coating pieces of refractory inert solid with wax, applying to said coated pieces to substantially completely enclose the same a layer of substantial thickness of wet workable mass which upon drying shrinks and develops a hard continuous shell of the desired adsorptive catalytic material, and subjecting the resulting units to elevated temperature sufficiently high to melt said coating of wax and to effect drying of said wet workable mass and shrinkage of the layer of the same into the volume occupied by said wax coating.

9. Process according to claim 8 wherein the wet workable mass comprises precipitated gel.

10. Process according to claim 8 wherein the wet workable mass comprises hydrosilicate of alumina.

11. In preparing catalytically active contact masses comprising adsorptive catalytic material and inert material in intimate relation, the process of coating pieces of refractory inert solid with wax, flowing around said coated pieces to provide a layer of substantial thickness substantially completely enclosing the same a wet workable mass which upon drying shrinks and develops a hard continuous shell of the desired adsorptive catalytic material, and subjecting the resulting units to elevated temperature sufficiently high to melt said coating of wax and to effect drying of said wet workable mass and shrinkage of the layer of the same into the volume occupied by said wax coating.

12. In preparing catalytically active contact masses comprising adsorptive catalytic material and inert material in intimate relation, the process of coating pieces of refractory inert solid with wax, commingling a plurality of said coated pieces with a wet workable mass which upon drying shrinks and develops a hard continuous shell of the desired adsorptive catalytic material, molding the resulting mixture, and subjecting the resulting units to elevated temperature sufficiently high to melt said coating of wax and to effect drying of said wet workable mass and shrinkage of the layer of the same into the volume occupied by said wax coating.

GEORGE R. BOND, Jr.

REFERENCES CITED

The following references are of record in the file of this patent:

UNITED STATES PATENTS

| Number | Name | Date |
| --- | --- | --- |
| 1,844,998 | Wietzel et al. | Feb. 16, 1932 |
| 2,384,945 | Marisic | Sept. 18, 1945 |
| 2,423,835 | Houdry | July 15, 1947 |